United States Patent
Hsieh (10) Patent No.: US 10,614,017 B1
(45) Date of Patent: Apr. 7, 2020

(54) USB EXTENSION DEVICE WITH DUAL POWER SUPPLY, AND DUAL POWER SUPPLY METHOD

(71) Applicant: ACTION STAR TECHNOLOGY CO., LTD., New Taipei (TW)

(72) Inventor: Kuo-Cheng Hsieh, New Taipei (TW)

(73) Assignee: ACTION STAR TECHNOLOGY CO., LTD. (TW)

( * ) Notice: Subject to any disclaimer, the term of this patent is extended or adjusted under 35 U.S.C. 154(b) by 0 days.

(21) Appl. No.: 16/352,771

(22) Filed: Mar. 13, 2019

(30) Foreign Application Priority Data

Feb. 27, 2019 (TW) .............................. 108106822 A (51) Int. Cl.
  *G06F 13/40* (2006.01)
  *G06F 13/42* (2006.01)
  *G06F 1/3287* (2019.01)
  *G06F 1/3234* (2019.01)

(52) U.S. Cl.
  CPC ........ *G06F 13/4045* (2013.01); *G06F 1/3253* (2013.01); *G06F 1/3287* (2013.01); *G06F 13/409* (2013.01); *G06F 13/4282* (2013.01); *G06F 2213/0042* (2013.01)

(58) Field of Classification Search
  CPC .. G06F 13/4045; G06F 1/3235; G06F 1/3287; G06F 3/409; G06F 13/4282
  See application file for complete search history.

(56) References Cited

U.S. PATENT DOCUMENTS 6,000,042 A * 12/1999 Henrie ...................... G06F 1/26
                                                    713/340
2002/0039319 A1 * 4/2002 Ohie ...................... G06F 13/385
                                                    365/226
2015/0180535 A1 * 6/2015 Yamaoka ............... H04B 3/145
                                                    323/274
2015/0248151 A1 * 9/2015 Lim ........................ G06F 1/266
                                                    713/310
2017/0228338 A1 * 8/2017 Ikenaga .................. G06F 13/36
2018/0341310 A1 * 11/2018 Lambert ................. G06F 1/266
2019/0171268 A1 * 6/2019 Ellis ....................... G06F 1/266

OTHER PUBLICATIONS

Universal Serial Bus Type-C Cable and Connector Specification, Revision 1.1, Apr. 3, 2015 (Year: 2015).*

* cited by examiner

*Primary Examiner* — Tim T Vo
*Assistant Examiner* — Phong H Dang (57) ABSTRACT

A USB extension device with dual power supply includes: a first power connection interface of USB Type-C and power transmission specification connected to a first power supply; a second power connection interface connected to a second power supply; a host connection interface of USB Type-C and power transmission specification connected to a host; an external interface connected to an external device; and a power supply management module connected to the first power connection interface, second power connection interface, host connection interface and external interface. When the first and second power connection interfaces are connected to the first and second power supplies respectively, the host supplies power through the host connection interface, and the power supply management module drives the first power supply to supply power to the host, while driving the second power supply to supply power to the power supply management module and to at least one external device.

8 Claims, 6 Drawing Sheets

USB EXTENSION DEVICE WITH DUAL POWER SUPPLY, AND DUAL POWER SUPPLY METHOD

FIELD OF INVENTION

The present invention relates to a universal serial bus (USB) extension device, in particular to an extension device with dual power supply that supports the USB Type-C and power transmission specification.

BACKGROUND OF INVENTION

1. Description of the Related Art

Due to the considerations of a thin, light, and portable design, the USB connection interface of present notebook computers or tablet PCs is decreasing, and there is still a need for external USB devices such as a mouse, a keyboard, a projector, an optical disk and an external hard disk for the application. Therefore, the demand for USB extension devices capable of additionally connecting USB devices is increased significantly. The USB extension devices such as USB hubs and USB docking station allows a plurality of USB external devices to be connected to a USB host (such as a notebook computer or a tablet PC) to increase the number of external USB devices connected to the USB host.

Figure 1:
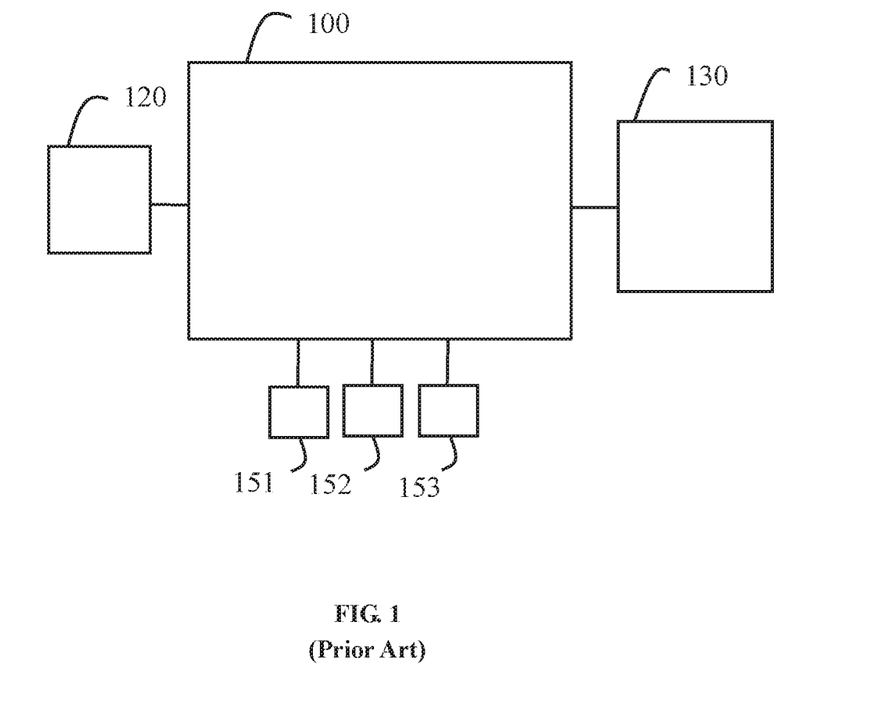
FIG. 1 shows a block diagram of a conventional USB power supply system with signal power supply.

With reference to FIG. 1 for a block diagram of a conventional USB power supply system with signal power supply, the traditional non-USB Type-C specification does not have the USB power transmission, and a USB extension device 100 with PD function is electrically coupled to an external DC power supply 120 (or USB power supply 120) and used as a source of electric power, or electrically coupled to the external DC power supply 120 and the USB power supply 120 at the same time, but one of the external DC power supply 120 and the USB power supply 120 is used as the source of power. In other words, both of the aforementioned two cases use a single power source as the source of power. If the USB power supply 120 is used as a source of power and the total power consumption of the USB external devices 151, 152, 153 connected to the USB extension device 100 is greater than the electricity supplied by the USB power supply 20, there will be system down, noise, insufficient voltage, detection failure, equipment damage, or any other adverse operating conditions that may lead to electrical hazards. If the external DC power supply 120 is used as a source of power, the selected external DC power supply 120 usually has a power consumption specification or standard higher than that of the USB external devices 151, 152, 153 to prevent the high power consumption from exceeding the supplied power capacity or causing accidents. However, there may be cases where an external DC power supply 120 without a high specification is used. In such a case, the total power consumption is greater than the supplied power capacity of the external DC power supply 120, and thus also leading to various adverse conditions and possible electrical hazards.

Further, the external DC power supply 120 of the extension device 100 that supports the USB Type-C specification and USB power transmission function has to satisfy the power consumption specification and standard and consider the power consumption of the USB host 130 and external devices 151, 152, 153 connected to the extension device 100. Once if the power supply of the external DC power supply 120 is insufficient, the USB host 130 will be unable to be charged, or can only be charged slowly, or it will lead to various adverse conditions of the extension device 100 and external devices 151, 152, 153. In a worst-case scenario, accidents such as overheat caused by overloads may occur. Therefore, the external DC power supply 120 usually needs the support of a high-power power supply. However, the high-power power supply consumes unnecessary power and does not guarantee the satisfaction of the power requirement of the USB host 130 (assumed that the demand for electricity will increase to 120 W in the future).

In summation of the description above, how to satisfy the power demand of the extension device, the USB host and the USB external device that support the USB Type-C specification and the USB power transmission function while taking the safety and power supply efficiency into consideration becomes an important and urgent issue to be solved.

2. Summary of the Invention

Therefore, it is a primary objective of the present invention to overcome the drawbacks of the prior art by disclosing a USB extension device with dual power supply, comprising: a first power connection interface, in compliance with a USB Type-C and power transmission specification, for electrically coupling a first power supply; a second power connection interface, for electrically coupling a second power supply; a host connection interface, in compliance with the USB Type-C and power transmission specification, for electrically coupling a host; at least one external interface, for electrically coupling at least one external device; and a power supply management module, electrically coupled to the first power connection interface, the second power connection interface, the host connection interface and the at least one external interface; wherein, the first power connection interface and the second power connection interface are respectively and electrically coupled to the first power supply and the second power supply at the same time, for supplying electric power according to the requirement of the host through the host connection interface, and the power supply management module drives the first power supply to supply electric power to the host through the host connection interface, and the power supply management module drives the second power supply to supply electric power to the power supply management module through the second power connection interface and supply electric power to the at least one external device through the at least one external interface.

The present invention further discloses a dual power supply method, applied to a USB extension device in compliance with a USB power transmission specification, and the USB extension device comprising a first power connection interface, a second power connection interface, a host connection interface, at least one external interface and a power supply management module, and the first power connection interface complying with a USB Type-C and power transmission specification and being electrically coupled to a first power supply, and the second power connection interface being electrically coupled to a second power supply, and the host connection interface complying with a USB Type-C and power transmission specification and being electrically coupled to a host, and the at least one extension connection interface being electrically coupled to at least one extension device; and the method comprising: communicating the power supply/receiving information in compliance with the USB Type-C and USB power transmission specification between the first power supply and the host; supplying the electric power of the first power supply to the host through the host connection interface according to the power supply/receiving information; and supplying the electric power of the second power supply to the power supply management module through the second power connection interface and to the at least one extension device through the at least one extension connection interface; wherein, the electric power receiving objects of the first power supply and the second power supply are different.

The USB extension device with dual power supply and dual power supply method in accordance with the present invention can meet the requirements and objectives of supplying power to the USB extension device, the USB host (or any power devices requiring large power consumption) and the USB external device while taking the electrical safety and power supply efficiency into consideration.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DESCRIPTION OF THE PREFERRED EMBODIMENTS

Universal Serial Bus (USB) is well known for its convenience of plug and play, and most electronic devices including desktop computers, notebook computers, tablet PCs, Smartphones, external hard disks, digital cameras, printers, digital televisions, and automobile communication entertainment systems rely on USB for data transmissions. USB may be considered as the most widely used transmission interface now.

Besides transmitting data, USB can also supply electric power. Since the early USB 2.0 can only provide 2.5 W, USB 3.0 can only provide 4.5 W, and the USB power transmission 1.0 announced in July 2012 has jumped up to 100 W of electric power. At this point, the USB power supply to devices such as tablet PCs and notebook computers expands the scope and types of the powered devices.

Subsequently, the USB PD 2.0 specification announced in August 2014 is the first to support the new USB 3.1 non-directional connectors. The early USB did not provide a way for the power receiving terminal to know the capability of the power supply terminal, but the USB PD 2.0 specification can solve this problem by using the bidirectional communication between two terminals through a specific USB Type-C configuration channel pin (a serial biphase mark code transmitted in a CC line can define the role of power during the period when two devices are connected and allow a power supply terminal and a power receiving terminal to know the other's capability and cooperate with each other in order to determine the transmitted voltage/current value, which is independently separated from the previous USB data communication channel.

Next, the USB PD 3.0 specification announced in March 2016 can support more and higher voltage types. Particularly, the USB PD 3.0 specification has added a programmable power supply function to allow bus voltage and current to be regulated accurately. In addition, this specification is compatible with the fast charge protocol of various manufacturers to and capable of supporting the latest Quick Charge (QC) 4.0.

The detailed technical contents of each version of the USB and USB Power Delivery specification can be found in published specifications.

Figure 2:
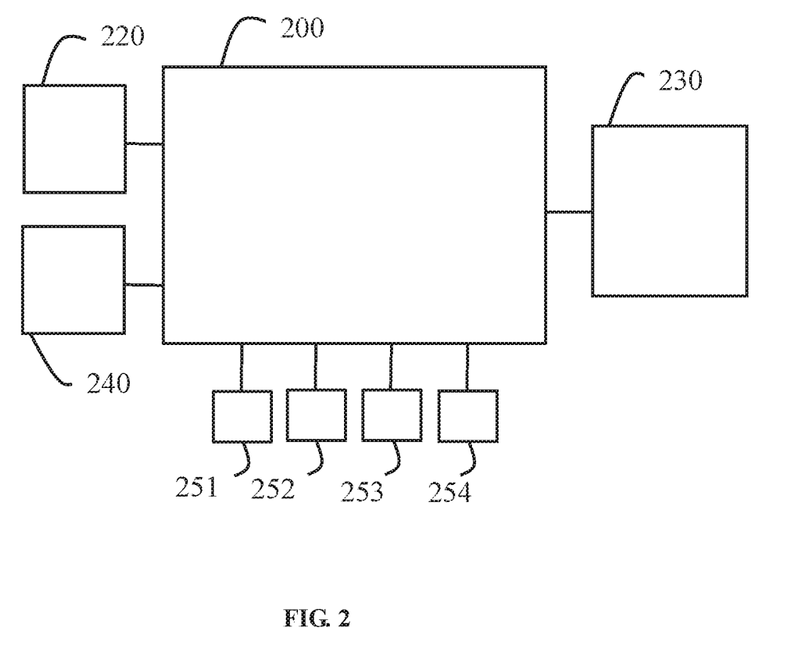
FIG. 2 shows a system block diagram of a USB extension device with dual power supply in accordance with a preferred embodiment of the present invention.
Figure 3:
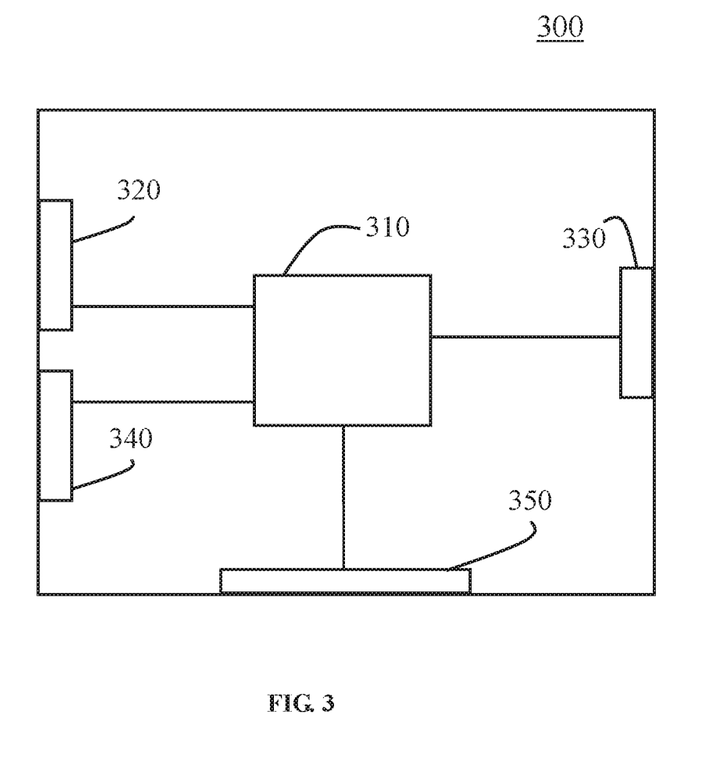
FIG. 3 shows a block diagram of a USB extension device with dual power supply in accordance with a preferred embodiment of the present invention.

With reference to FIGS. 2 and 3 for a system block diagram and a block diagram of a USB extension device with dual power supply in accordance with a preferred embodiment of the present invention respectively, the USB extension device with dual power supply 200 is electrically coupled to a first power supply 220, a second power supply 240, a host 230 and a plurality of external devices 251, 252, 253, 254. In FIGS. 2 and 3, the USB extension device with dual power supply 300 is electrically coupled to the first power supply 220 through a first power connection interface 320, and electrically coupled to the second power supply 240 through a second power connection interface 340, and electrically coupled to the host 230 through a host connection interface 330, and electrically coupled to the external device 251, 252, 253, 254 through an external interface 350 (wherein the external interface 350 shown in the schematic block diagram actually comes with a quantity of four separate external interfaces electrically coupled to the external devices 251, 252, 253, 254).

In the preferred embodiment of the present invention as shown in FIG. 3, the USB extension device with dual power supply 300 has a power supply management module 310 electrically coupled to the first power connection interface 320, the second power connection interface 340, the host connection interface 330 and the external interface 350, and the first power connection interface 320 and the host connection interface 330 support a USB Type-C and power transmission specification. In other words, the first power connection interface 320 and the host connection interface 330 have a configuration channel therein. The power supply management module 310 is provided for a bi-directional communication of the voltage value/current value related to the power supply/receiving of the first power connection interface 320 and the host connection interface 330. The host connection interface 330 may be a power supply terminal or a power receiving terminal, and it is a power receiving terminal in this embodiment of the invention.

For example, the USB extension device 200 is a USB hub or a USB docking station that supports the USB power transmission specification. The first power supply 220 and the second power supply 240 may be any electric power sources that supply electric power and support the USB power transmission specification. In an embodiment, the first power supply 220 is a DC power supply. The host 230 may be a device such as a desktop computer, a notebook computer, or a tablet PC that support the USB power transmission specification or any other device requiring large power consumption and supporting the USB power transmission specification. These arrangements are used as an example to illustrate the present invention but not intended for limiting the scope of the invention.

The second power connection interface 340 and the external interface 350 are USB connection interfaces that support the specifications of USB 2.0, 3.0, 3.1, etc. In an embodiment, these interfaces can also support a USB Type-C and USB power transmission specification, but the present invention is not just limited to these arrangements only.

In a preferred embodiment of the present invention, the USB extension device 200 is electrically coupled to the first power supply 220 by a first power connection interface 320, and the USB extension device 200 is electrically coupled to the second power supply 240 by a second power connection interface 340. Now, the host 230 plays a role of an electric receiving end for receiving electric power. Wherein, the host 230 has a USB controller and a USB connection interface (not shown in the figure) that support the USB Type-C and USB power supply, and the host 230 is electrically coupled to the host connection interface 330 of the USB extension device 200 by the USB connection interface of the host 230, and the host 230 performs a bidirectional information communication related to the power supply/receiving by the USB controller of the host 230 through the USB connection interface of the host and the host connection interface 330 of the USB extension device. The first power supply 220 performs a bidirectional information communication related to the power supply/receiving through the first power connection interface 320 and the USB extension device 200.

Electric power is supplied through the host connection interface 330 according to the requirements of the host 230, and the power supply management module 310 drives the first power supply 220 to supply power to the host 230 through the host connection interface 330. In the meantime, the power supply management module 310 drives the second power supply 240 to supply power to the power supply management module 310 through the second power connection interface 340 and to the external devices 251, 252, 253, 254 through the external interface 350. In other words, the electric power required by the host 230 totally comes with the first power supply 220, without being affected by the power consumption of the external devices 251, 252, 253, 254 and the USB extension device 200. The power of the external devices 251, 252, 253, 254 and the USB extension device 200 is supplied by the second power supply 240. In other words, the power receiving object of the first power supply 220 is different from that of the second power supply 240.

Figure 4:
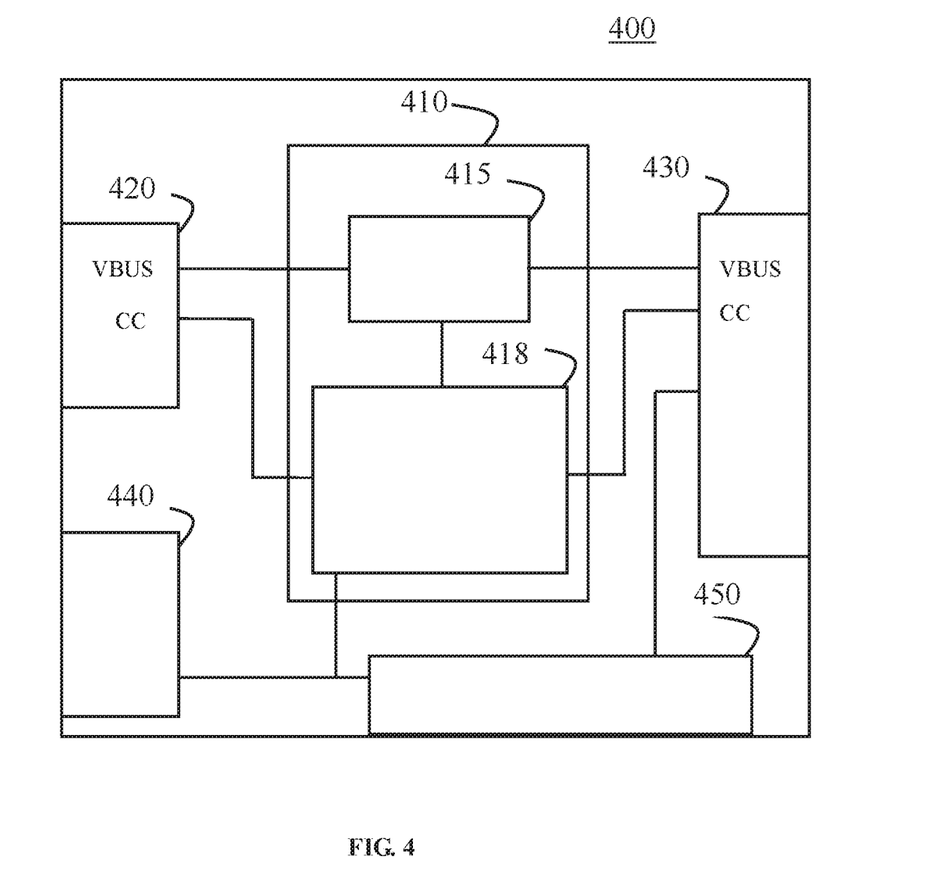
FIG. 4 shows a block diagram of a USB extension device with dual power supply in accordance with another preferred embodiment of the present invention.

With reference to FIG. 4 for the detailed description on how to supply power, FIG. 4 is a block diagram of a USB extension device with dual power supply in accordance with another preferred embodiment of the present invention, the power supply management module 410 further comprises a power supply and demand transaction processing unit 418 and a power supply and demand switch and conversion unit 415, and the power supply and demand transaction processing unit 418 and the power supply and demand switch and conversion unit 415 are electrically coupled to each other for communicating signals. The power supply and demand switch and conversion unit 415 is capable of detecting the electric power status of the first power connection interface 420 and the host connection interface 430 and accepting the inquiry of the power supply status of the power supply and demand transaction processing unit 418. In addition, the power supply and demand switch and conversion unit 415 has the functions of DC conversion and voltage regulation and is capable of turning on/off an electric power channel between the first power connection interface 420 and the host connection interface 430.

The first power connection interface 420 is electrically coupled to the power supply and demand switch and conversion unit 415 and provided for transmitting the electric power of the first power supply 220 to the power supply and demand switch and conversion unit 415 through a VBUS pin of the USB Type-C specification. The first power connection interface 420 comprises a configuration channel and is capable of communicating with the power supply management module 410 and confirming the supply power. The first power connection interface 420 is electrically coupled to the power supply and demand transaction processing unit 418 through a CC pin of the USB Type-C specification and communicates power supplying/receiving information related to the first power supply 220 and the host 230.

The host connection interface 430 is electrically coupled to the power supply and demand switch and conversion unit 415, and the electric power transmitted from the power supply and demand switch and conversion unit 415 is received by the VBUS pin of the USB Type-C specification. The power supply and demand transaction processing unit 418 is electrically coupled to the host connection interface 430 by the CC pin of the USB Type-C specification for communicating the power supply/receiving related information with the first power supply 220 and the host 230.

The second power connection interface 440 is electrically coupled to the power supply and demand transaction processing unit 418 and the external interface 450 and provided for supplying electric power to the power supply and demand transaction processing unit 418 through the second power connection interface 440 and to the external devices 251, 252, 253, 254 through the external interface 450.

The external interface 450 is electrically coupled to the host connection interface 430, and USB data signals are communicated between the external interface 450 and the host connection interface 430, and the external devices 251, 252, 253, 254 transmit the USB data signal to the host connection interface 430 through the external interface 450 and then transmitted to the host 230. In the opposite path, the host 230 transmits the USB data signal to the external interface 450 through the host connection interface 430 and then transmits the USB data signal to the external devices 251, 252, 253, 254.

In the USB Type-C specification, the electric power may be transmitted bidirectionally to ensure the correctness of the voltage and directionality, and thus communication is required in advance. The step of supplying electric power through the host connection interface 330 according to the requirement of the host 230 further comprises the following steps. The power supply and demand transaction processing unit 418 through the configuration channel inquires the power supply capability data provided by the first power supply 220 through the first power connection interface 420 and obtain a reply from the first power connection interface 420 (wherein the reply is a power supply table containing power configuration parameters (different bus voltage and current data) provided by the first power connection interface 420, and the host 23 provides the power supply capability data through the inquiry of the host connection interface 430, and the power supply and demand transaction processing unit 418 replies the host 230 with the power supply table through the host connection interface 430. According to the power supply table replied from the power supply and demand transaction processing unit 418, the host 230 proposes the required power of the power supply through the host connection interface 430.

The step of the power supply management module 310 supplying the electric power of the first power supply 220 to the host 230 through the host connection interface 330 further comprises the following steps: The power supply and demand transaction processing unit 418 through a configuration channel proposes to the first power connection interface 420 with regard to the required power of the power supply proposed by the host 230 through the host connection interface 430, and the first power supply 220 receives the power of the power supply required by the host 230 through the first power connection interface 42 and modifies the bus voltage into a corresponding parameter. After examining and confirming that the supplied power is correct, the power supply and demand transaction processing unit 418 notices the power supply and demand switch and conversion unit 415 to turn on the power supply transmission channel between the first power connection interface 420 and the host connection interface 430 (wherein the power supply and demand switch and conversion unit 415 has not carries out the voltage regulation yet), so that the electric power of the first power supply 220 is supplied to the host 230 through the USB Type-C VBUS pin of the first power connection interface 420 and the USB Type-C VBUS pin of the host connection interface 430. Now, the power come from the first power supply 240 of the first power connection interface 420 is supplied to the host 230 only. The aforementioned method going through the inquiry, communication, and supplying the required power flexibly provides an efficient power supply mode and prevents wasting unnecessary energy.

The present invention provides a dual power supply method applied to a USB extension device in compliance with the USB power transmission specification. In FIG. 2, the USB extension device with dual power supply 200 is electrically coupled to the first power supply 220, the second power supply 240, the host 230 and the external devices 251, 252, 253, 254. In FIGS. 2 and 3, the USB extension device 300 comprises a first power connection interface 320, a second power connection interface 340, a host connection interface 330, an external interface 350 and a power supply management module 310. The USB extension device with dual power supply 300 is electrically coupled to the first power supply 220 through the first power connection interface 320, and electrically coupled to the second power supply 240 through second power connection interface 340, and electrically coupled to the host 230 through the host connection interface 330, and electrically coupled to the external devices 251, 252, 253, 254 through the external interface 350 (wherein the external interface 350 as shown in the schematic block diagram actually comes with a quantity of four, and these four separate external interfaces are electrically coupled to the external devices 251, 252, 253, 254 respectively). Please refer to the section above for other descriptions related to FIGS. 2 and 3.

Figure 5:
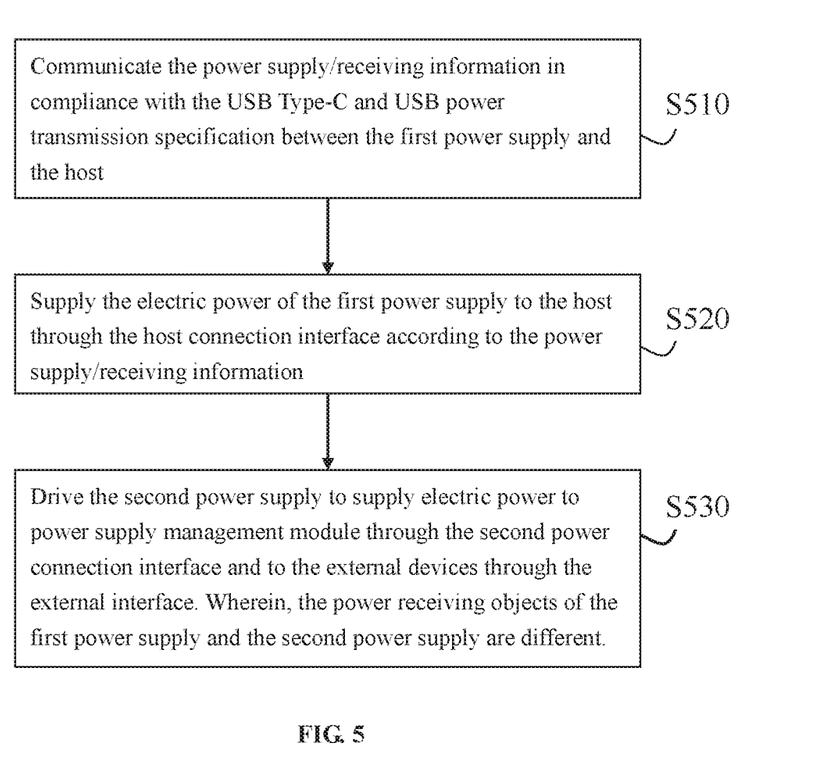
FIG. 5 shows a flow chart of a dual power supply method in accordance with an embodiment of the present invention.

With reference to FIG. 5 for a flow chart of a dual power supply method in accordance with an embodiment of the present invention, the dual power supply method comprises the following steps:

S510: Communicate the power supply/receiving information in compliance with the USB Type-C and USB power transmission specification between the first power supply 220 and the host 230.

S520: Supply the electric power of the first power supply 220 to the host 230 through the host connection interface 330 according to the power supply/receiving information.

S530: Drive the second power supply 240 to supply electric power to power supply management module 310 through the second power connection interface 340 and to the external devices 251, 252, 253, 254 through the external interface 350. Wherein, the power receiving objects of the first power supply 220 and the second power supply 240 are different.

Figure 6:
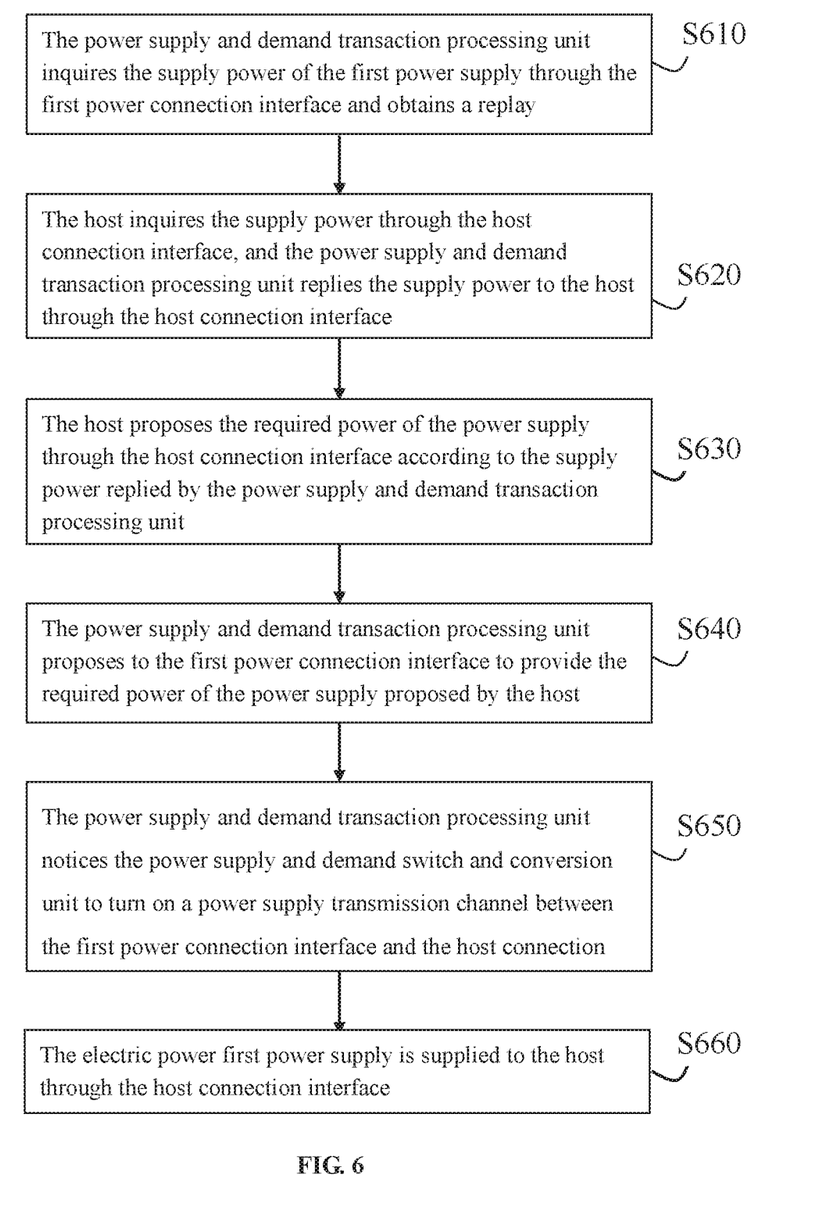
FIG. 6 shows a flow chart of a dual power supply method in accordance with another embodiment of the present invention.

With reference to FIG. 4 for a more detailed description, the power supply management module 410 further comprises a power supply and demand transaction processing unit 418 and a power supply and demand switch and conversion unit 415. The power supply and demand switch and conversion unit 415 is capable of detecting a power supply status of the first power connection interface 320 and the host connection interface 330 and accepting an inquiry of the power supply status of the power supply and demand transaction processing unit 418. In addition, the power supply and demand switch and conversion unit 415 has the functions of direct current (DC) conversion and voltage regulation and is capable of turning on/off an electric power channel between the first power connection interface 420 and the host connection interface 430. The first power connection interface 320 comprises a configuration channel capable of communicating with the power supply management module 410 and confirming the supply power. Please refer to the section above for other descriptions related to FIG. 4, and these descriptions will not be repeated. With reference to FIG. 6 for a flow chart of a dual power supply method in accordance with another embodiment of the present invention, the step of communicating the power supply/receiving information in compliance with the USB Type-C and USB power transmission specification between the first power supply 220 and the host 230 further comprises the following steps:

S610: The power supply and demand transaction processing unit 418 inquires the supply power of the first power supply 220 through the first power connection interface 320 and obtains a replay.

S620: The host 230 inquires the supply power through the host connection interface 330, and the power supply and demand transaction processing unit 418 replies the supply power to the host 230 through the host connection interface 330.

S630: The host 230 proposes the required power of the power supply through the host connection interface 330 according to the supply power replied by the power supply and demand transaction processing unit 418. The step S520 of supplying the electric power of the first power supply 220 to the host 230 through the host connection interface 330 according to the power supply/receiving information further comprises the following steps:

S640: The power supply and demand transaction processing unit 418 proposes to the first power connection interface 320 to provide the required power of the power supply proposed by the host 230 through the host connection interface 330.

S650: The power supply and demand transaction processing unit 418 notices the power supply and demand switch and conversion unit 415 to turn on a power supply transmission channel between the first power connection interface 320 and the host connection interface 330.

S660: The electric power first power supply 220 is supplied to the host 230 through the host connection interface 330.

In summation of the description above, an USB extension device is formed by a power supply management module and a connection interface of the present invention that support the USB power transmission specification, so that the first power supply can supply power to the host (or any other device requiring large power supply) efficiently, and the second power supply supplies power to the USB extension device and the external device, and the dual power supplies can supply power to different electrical power receiving objects simultaneously to achieve the effect of satisfying the power demand of the electrical power receiving equipment and the requirements for electrical safety and power supply efficiency.

What is claimed is:

1. A USB extension device with dual power supply, comprising:
    a first power connection interface, in compliance with USB Type-C and power transmission specifications, for electrically coupling a first power supply;
    a second power connection interface, for electrically coupling a second power supply;
    a host connection interface, in compliance with the USB Type-C and power transmission specifications, for electrically coupling a host;
    at least one external interface, for electrically coupling at least one external device; and
    a power supply management module, electrically coupled to the first power connection interface, the second power connection interface, the host connection interface and the at least one external interface;
    wherein, the first power connection interface and the second power connection interface are respectively and electrically coupled to the first power supply and the second power supply at the same time, the power supply management module inquires about power supply capability data provided by the first power supply through the first power connection interface and receives a reply, the host inquires and the power supply management module replies the host with the power supply capability data through the host connection interface, the host proposes required power of the power supply according to the power supply capability data provided by the first power supply through the host connection interface, the power supply management module proposes to the first power connection interface with regard to the required power of the power supply proposed by the host and turns on a power supply transmission channel between the first power connection interface and the host connection interface, the power supply management module drives the first power supply to supply electric power according to the required power of the power supply proposed by the host through the host connection interface to the host, and the power supply management module drives the second power supply to supply electric power to the power supply management module through the second power connection interface and supply electric power to the at least one external device through the at least one external interface.

2. The USB extension device with dual power supply according to claim 1, wherein the power supply management module further comprises a power supply and demand transaction processing unit and a power supply and demand switch and conversion unit.

3. The USB extension device with dual power supply according to claim 1, wherein the first power connection interface comprises a configuration channel and is capable of communicating with the power supply management module and confirming a supply power.

4. The USB extension device with dual power supply according to claim 1, wherein the first power supply is a direct current (DC) power supply.

5. A dual power supply method, applied to a USB extension device in compliance with USB Type-C and power transmission specifications, and the USB extension device comprising a first power connection interface, a second power connection interface, a host connection interface, at least one external interface and a power supply management module, and the first power connection interface complying with the USB Type-C and power transmission specifications and being electrically coupled to a first power supply, and the second power connection interface being electrically coupled to a second power supply, and the host connection interface complying with the USB Type-C and power transmission specifications and being electrically coupled to a host, and the at least one extension connection interface being electrically coupled to at least one extension device; and the method comprising:
    inquiring about power supply capability data provided by the first power supply through the first power connection interface;
    replying an inquiry of the host with the power supply capability data through the host connection interface;
    proposing to the first power connection interface with regard to required power of the power supply, wherein the required power of the power supply is proposed by the host according to the power supply capability data provided by the first power supply;
    turning on a power supply transmission channel between the first power connection interface and the host connection interface;
    supplying electric power of the first power supply to the host according to the required power of the power supply proposed by the host through the host connection interface; and
    supplying electric power of the second power supply to the power supply management module through the second power connection interface and to the at least one extension device through the at least one extension connection interface;
    wherein, electric power receiving objects of the first power supply and the second power supply are different.

6. The dual power supply method according to claim 5, wherein the power supply management module further comprises a power supply and demand transaction processing unit and a power supply and demand switch and conversion unit.

7. The dual power supply method according to claim 5, wherein the first power connection interface comprises a configuration channel capable of communicating with the power supply management module and confirming the supply power.

8. The dual power supply method according to claim 5, wherein the first power supply is a DC power supply.

* * * * *